Feb. 7, 1928.
F. J. MacDONALD
1,658,565
METHOD AND APPARATUS FOR FORMING ARTICLES OF PLASTIC MATERIAL
Original Filed May 13, 1924
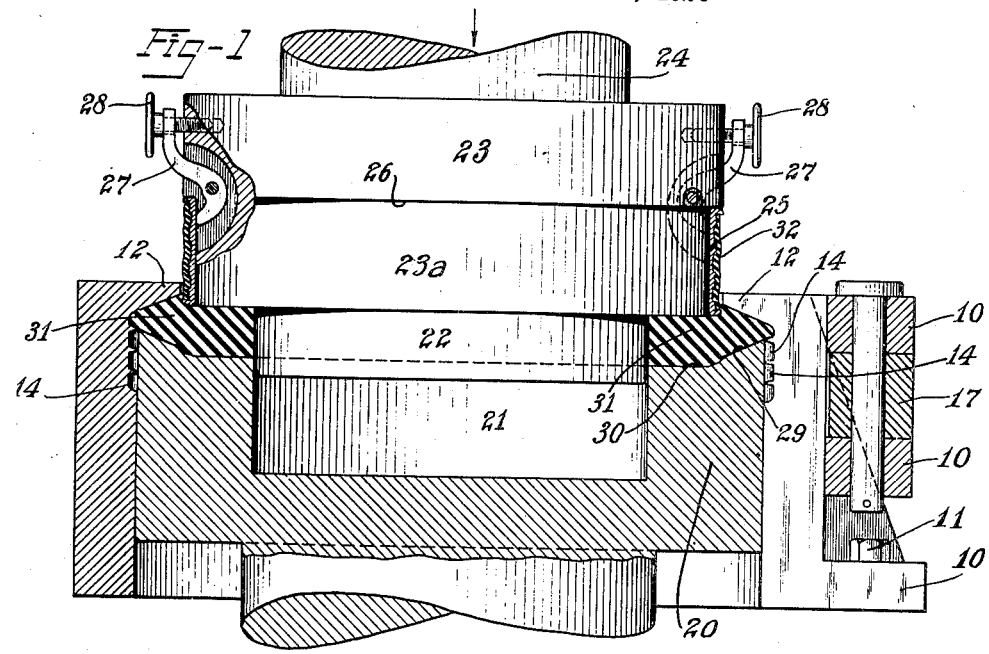
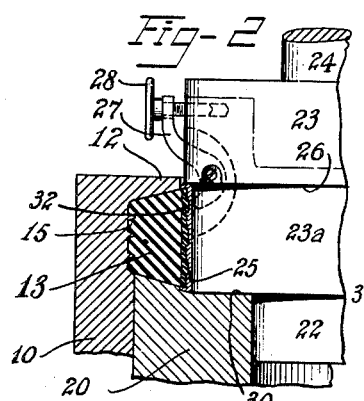
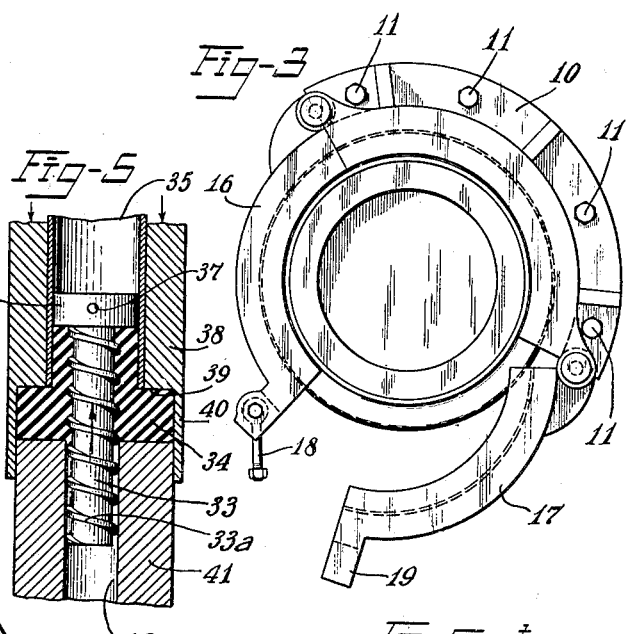
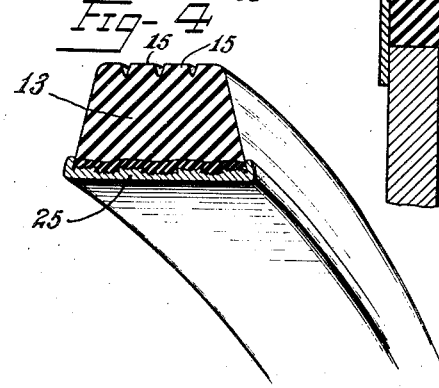
Inventor-
Frank J. MacDonald-
By Robert M. Pierson
Atty- Patented Feb. 7, 1928.

1,658,565

UNITED STATES PATENT OFFICE.

FRANK J. MacDONALD, OF AKRON, OHIO, ASSIGNOR TO THE B. F. GOODRICH COMPANY, OF NEW YORK, N. Y., A CORPORATION OF NEW YORK.

METHOD AND APPARATUS FOR FORMING ARTICLES OF PLASTIC MATERIAL.

Application filed May 13, 1924, Serial No. 713,077. Renewed August 15, 1927.

This invention relates to the art of shaping plastics, and in certain aspects is an improvement upon the inventions described and claimed in my copending applications Serial No. 697,009, filed March 5, 1924, and Serial No. 704,503, filed April 5, 1924.

In those applications I have described procedure and apparatus wherein a mass of plastic stock is substantially enclosed in a space defined by three shaping members, and given the form desired by so moving each of said members with relation to the others as to change the shape of said space to that of the finished article. In the inventions claimed in said applications, one of the shaping members moves with the flowing stock, and the stock is progressively applied to such member as the latter moves past the unformed portion of the plastic mass, so as to minimize friction between the stock and said member, or friction in the stock adjacent said member, but in said applications I do not claim the idea of progressively applying plastic stock to a shaping member of uneven or recessed surface without extended flow of stock along said surface, this idea constituting in part the subject matter of the present application.

So far as I am aware, in operations employed, prior to my present invention, for shaping an article of plastic material against confining members, where one of the latter is formed with an uneven or recessed molding surface and the stock is radically changed in shape, the stock has been required to conform itself to such uneven surface by extensively flowing with relation to and along the latter, as in forcing a mandrel into a one-piece mold containing the plastic stock. Such flowing of the stock not only requires a high molding pressure, where the stock is required to flow for a long distance, but the cumulative resistance to flow, as the flowing stock extends itself between the shaping members, may result in such unbalanced reaction against the shaping members, in the case of a stiff plastic, as to make it difficult or impossible to preserve the proper alignment or relative positioning thereof.

The chief object of my present invention is to provide improved procedure and apparatus for forming, of plastic material, an article having an uneven or recessed surface, or of irregular form. A more specific object is to form such an article by applying a plastic progressively to an uneven surface without requiring the stock to conform itself to such surface by extensively flowing along and with relation to the latter. A further object is to avoid the trapping of air in the recesses of a molding surface as the stock is applied thereto.

Of the accompanying drawings:

Fig. 1 is an elevation, but with parts broken away, and in section, of apparatus adapted to mold a grooved-tread solid tire in accordance with a preferred form of my invention, and the work in place, at the beginning of the molding operation.

Fig. 2 is a similar view of a part of the same, at the end of the molding operation.

Fig. 3 is a plan view of the apparatus.

Fig. 4 is a sectional perspective view of the finished tire.

Fig. 5 is a vertical section of a modification adapted for shaping a hollow plastic article, such as a rubber bearing, having an uneven or recessed inner surface.

Referring to the drawings, 10 is an arcuate mold member secured upon a suitable support (not shown) by screw-bolts 11, 11, and formed about its inner, upper side with a flange 12 adapted to mold a side face of the body 13 of the solid tire. Below said flange said mold member is formed with longitudinal grooves 14, 14, adapted to mold circumferential ribs 15, 15 on the tire body, and below said grooves the inner face of said member is cylindrical. Hinged to the respective ends of said mold member are arcuate mold members 16, 17, of the same internal contour, adapted with the member 10 to provide a complete annular mold structure, and adapted to be held together in such relation by a clamping bolt 18, Fig. 3, pivoted on the free end of the section 16 and adapted to engage in a slotted lug 19 on the free end of the section 17.

Telescoping with the cylindrical portion of the mold structure 10, 16, 17, from below, is a ram head 20 supported preferably by yielding means (not shown), and formed on its upper end face with a cylindrical recess 21 adapted to receive and guide a boss 22 projecting downward from a circular head 23 formed on the lower end of an upper ram 24. Said head is of reduced diameter in its lower part, 23$^a$, to fit within a tire base 25, the latter abutting a shoulder 26 at the upper limit of said reduced portion. Vertical clamping levers 27, 27 are pivoted in recesses in the head 23. An actuating screw 28 is loosely mounted in an aperture in the upper end of each lever and threaded into the head 23, the lower arms of said levers thus being adapted to be forced outward against the tire base 25 to clamp the latter in position upon the head.

The upper, annular face of the ram head 20, about the recess 21, comprises an outer portion 29 adapted to mold the lower side face of the tire body, and an inner portion 30 of plane, annular form of substantially the same vertical projection as that of the portion 23ª of the head 23 and the tire base thereon. The parts as described are adapted substantially to enclose a space filled by a mass of plastic rubber compound 31 of suitable quantity for the formation of the tire body, as shown in Fig. 1. The tire base 25 may be provided with the usual layer of hard rubber compound 32.

In the operation of the apparatus, the head 23 being raised, the ram head 20 is lowered and the annular mass of warmed stock 31, of less radial width than the molding face 29, 30, is mounted upon said face. The sectional mold structure 10, 16, 17 may be opened out to facilitate such mounting of the stock, or the head 20 may be lowered clear of said mold structure.

The head 23 is then lowered until the lower edge of the tire base is opposite the flange 12 of the sectional mold structure and the ram head 20 is forced upward, causing the mass to take shape substantially as shown in Fig. 1, and filling the annular space defined by the adjacent members. The upper ram head 23 is then positively driven downward while the lower head, 20, is yieldingly supported, with sufficient force to extrude substantially all of the stock from between its face 30 and the head 23, as said lower head is compelled to recede downward by the force of the upper head 23 upon the stock.

As the two heads are thus forced downward, the increase of the distance between the flange 12 and the face 29 of the lower head permits the stock to flow from between the upper head 23 and the face 30 of the lower head, passing thus onto the outer face of the tire base and into the grooves 14 of the mold structure.

Each of said grooves is filled individually as they are successively uncovered by the downward movement of the lower head 20, and they are thus filled by flow of stock directly from the main body of the mass, without extensive flow along the grooved surface. When the tire body is thus completely molded, the condition at the end of the molding being shown in Fig. 2, the lower head, 20 is relieved of its yielding pressure and held in fixed position, the clamping levers 27 are released and the upper head 23 raised, leaving the work in the mold structure 10, 16, 17, and the latter is opened out and the work removed therefrom and vulcanized, producing the tire shown in Fig. 4.

In the modification shown in Fig. 5, a mandrel 33 is formed with a helical thread or rib 33ª, to mold a helical groove in a mass of rubber compound 34 which is to be formed as a lining or bushing in a bearing sleeve 35. Said mandrel is formed with a head 36 slidably fitting within the sleeve 35, and a transverse aperture 37 in said head is adapted to receive a bar for unscrewing the mandrel from the finished work. The sleeve 35 is fitted within a cylindrically hollow pressing member 38, with its lower end flush with a shoulder 39 formed on the interior of said member, and the latter is formed with an annular flange or sleeve 40 extending from the outer periphery of said shoulder and telescoped over a male pressing member 41. The latter is formed with an axial bore 42 adapted to accommodate the threaded portion of the mandrel 33 with a sliding fit.

In the operation of this modified type of apparatus, an annular mass of the unvulcanized rubber compound 34, at suitable temperature, is mounted upon the mandrel, against the head 36 of the latter, and the opposite end of the mandrel is inserted in the bore 42 of the pressing member 41. The sleeve 35 and the pressing member 38 in which it is mounted are then assembled upon the mandrel head 36 and the pressing member 41, and, while held against relative axial movement, are forced toward said member 41 with such pressure as to cause the stock to rise in the sleeve 35, bearing against the head 36 of the mandrel and carrying the latter upward with it, the threaded portion of the mandrel thus being caused to move upward into the sleeve 35, with the flowing stock. The upward movement of the mandrel may be resisted, if necessary or desired, in order to increase the pressure of the plastic mass and thereby assure that it will conform to the mandrel at all points. After the operation has started however, the friction in the rising mass of stock will afford a substantial resistance such as to provide a strong compression of the stock against the mandrel.

When the sleeve 35 has thus been completely lined by the extrusion of the stock thereinto, the sleeve 35, with the stock and the mandrel therein, is removed from the apparatus and the sleeve and mandrel assembly is vulcanized, after which the mandrel is unscrewed and thus removed from the work.

In this modification, as in the structure of Fig. 1, the plastic stock is progressively applied to a shaping member of uneven surface by direct flow of the stock from an unformed mass, so that air is expelled from between the shaping member and the stock as the latter is applied, and the necessary flow of stock with relation to the shaping members is minimized as compared with ordinary molding operations in which a mass of stock is radically changed in shape by means of shaping members.

Further modifications may be resorted to without departing from the scope of my invention and I do not wholly limit my claims to the exact procedure described or the specific constructions shown.

I claim:

1. The method of shaping an article of uneven surface from plastic material which comprises confining and compressing a supply mass of stock while relatively moving it past and pressing it against a shaping member of uneven shaping surface, whereby stock is given off against said surface.

2. The method of applying a plastic to an uneven molding surface which comprises relatively moving a stock-confining member along said surface in close proximity thereto while so pressing a mass of plastic stock against said confining member and said surface at their junction as to cause said stock to be given off, directly from the mass, against said surface.

3. The method of applying a plastic to an uneven molding surface which comprises relatively moving a stock-confining member along said surface in close proximity thereto while pressing a plastic mass against said confining member and said surface at the rear of said confining member.

4. The method of shaping an article of uneven surface of plastic material which comprises relatively moving a shaping member of uneven shaping surface past a second shaping member while so flowing plastic stock into the space between the two as to cause it to be applied progressively to said uneven surface by direct flow from the unformed mass, said shaping member of uneven surface being moved in the same direction as that of the flow of stock between the two.

5. The method of molding a rubber tire body which comprises extruding an integral, coherent, plastic mass of rubber onto a tire base while maintaining the extruded rubber under pressure in tire form, the mass of rubber being radically changed in shape by flow thereof in an integral, coherent, plastic condition.

6. The method of molding a rubber tire body which comprises flowing an integral, coherent, plastic mass of rubber transversely onto a tire base, into tire form, while maintaining the mass under pressure as it assumes tire form, the mass of rubber being radically changed in shape by flow thereof in an integral, coherent, plastic, condition.

7. The method of molding a rubber tire body which comprises relatively moving a tire base and a tread molding member in an axial direction, in telescoped relation, while flowing a mass of rubber into the space between the two.

8. Apparatus for shaping an article of plastic material, said apparatus comprising a shaping member of uneven shaping surface and means for so compressing a supply mass of stock and relatively moving it along said surface in contact therewith as to cause stock to be given off progressively against said surface from the supply mass.

9. Apparatus for shaping an article of plastic material, said apparatus comprising a shaping member of uneven shaping surface, a stock-confining member relatively movable along said surface in close proximity thereto, and means for pressing a plastic mass against said confining member and said surface at their junction during such relative movement.

10. Apparatus for shaping an article of plastic material, said apparatus comprising a shaping member of uneven shaping surface, a stock-confining member relatively movable along said surface in close proximity thereto, and means for pressing a plastic mass against said confining member and said surface at the rear of said confining member.

11. Apparatus for shaping an article of plastic material, said apparatus comprising a shaping member of uneven shaping surface, a second shaping member spaced therefrom and relatively movable alongside thereof, and means for so flowing a mass of stock into the space between the two as to cause it to be applied progressively to said uneven surface by direct flow from the unformed mass.

12. Apparatus for molding a rubber tire-body, said apparatus comprising means for extruding a mass of rubber onto a tire-base, and means for maintaining the mass under pressure as it assumes tire form, the extruding means and the pressure maintaining means being adapted to effect a radical change of shape of the mass while it is maintained under substantially full molding pressure.

13. Apparatus for molding a rubber tire-body, said apparatus comprising means for flowing a mass of rubber transversely onto a tire-base, into tire form, while maintaining the mass under pressure as it assumes tire form, the extruding means and the pressure maintaining means being adapted to effect a radical change of shape of the mass while it is maintained under substantially full molding pressure.

14. Apparatus for molding a rubber tire-body, said apparatus comprising a mold structure adapted to shape one side face and the tread face of the tire, means for relatively moving a tire-base in telescoped relation with said structure, and a side-molding member adapted to force a mass of stock between the two as the tire-base is so relatively moved.

15. The method of shaping an article of uneven surface from plastic material which comprises substantially enclosing a mass of the material with rigid mold members one of which is formed with an uneven shaping surface and so moving said members with relation to each other as radically to change the shape of the material while maintaining it under substantially full molding pressure, the shaping member of uneven surface being caused to move along with the flow of stock adjacent thereto.

16. Apparatus for shaping plastic material, said apparatus comprising a shaping member formed with recesses flanked by lands and isolated from each other thereby, a stock confining member adapted to be moved along said shaping member in contact with said lands and so complementally formed with relation thereto as completely to close the recesses which it overlies and to open said recesses progressively and in succession at its rear end while remaining fitted against the land adjacent the opening recess, and means for so pressing a mass of stock against said stock confining member at its rear end as to cause stock to flow from the mass into the recesses as they are thus successively opened, one of the said members being hollow and the other adapted to telescope therein.

In witness whereof I have hereunto set my hand this 9th day of May, 1924.

FRANK J. MacDONALD.